June 6, 1933.  R. J. NORTON  1,912,789
BRAKE DRUM
Filed July 16, 1931
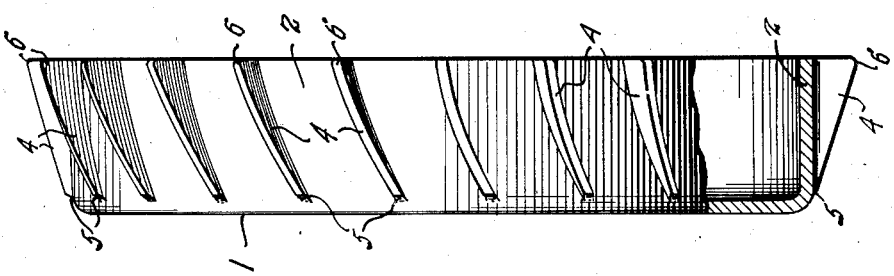
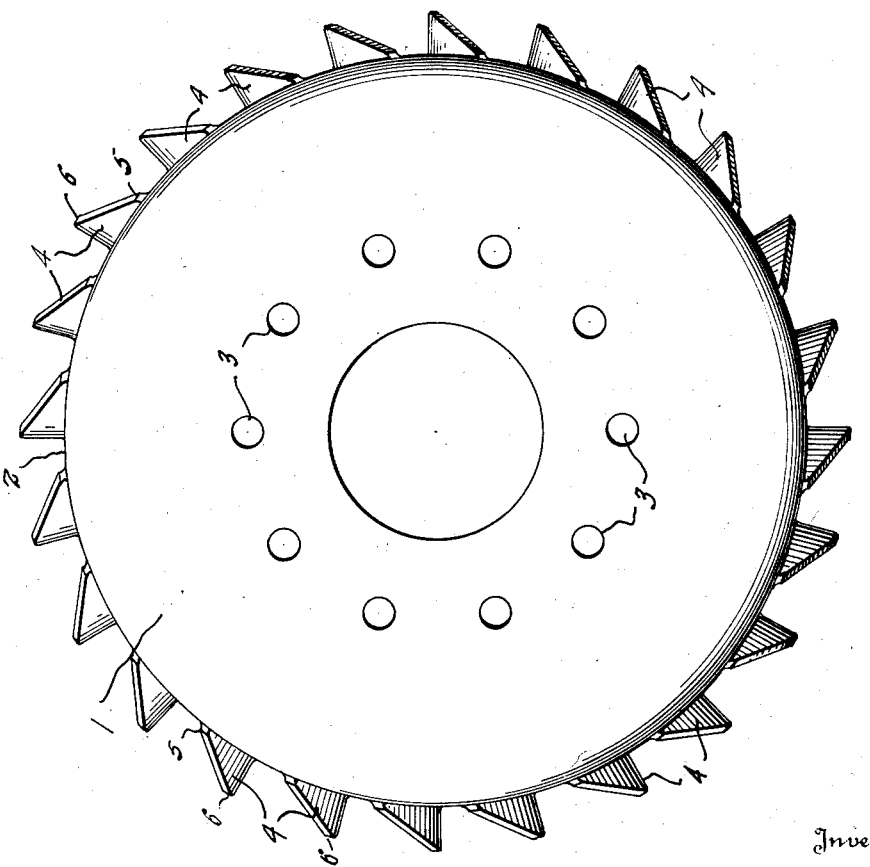
Inventor
RAYMOND J. NORTON
By Semmes & Semmes
and R. W. McConkey
Attorneys Patented June 6, 1933

1,912,789

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE DRUM

Application filed July 16, 1931. Serial No. 551,220.

This invention relates to brake drums and more particularly to a brake drum having improved mechanical, thermal and acoustical characteristics.

The usual form of brake drum now employed on automotive vehicles comprises a pressed steel member having a disc-like head and an integral circumferential braking flange. These are made either of cast iron or pressed steel, by far the larger number being made of a low carbon stamping. With the general use of the servo brake the problem of constructing a brake drum sufficiently rigid to withstand the stresses of braking, as well as one which will efficiently dissipate the generated frictional heats, is a difficult one. In the past efforts have been made to dissipate generated heat from the drum by providing the exterior surface of the drum with circumferential fins, the purpose of which is to increase the heat dissipative area of the drum.

In recent years some attention has been paid to the problem of eliminating that noise of brake application which is generally defined as "squealing". The squealing of brake drums is probably due, among other things, to the fact that the drum itself vibrates, due to the application of the resinous brake band and this vibration generates the discordant note or notes. Some few attempts have been made to eliminate or minimize this squealing. These have comprised largely the association with the drum of buffer members, such as rubber, which tend to absorb or dampen the produced sound.

The present invention has for its major object the production of a brake drum of improved mechanical, thermal and acoustical properties.

Another object is to provide a brake drum of simple structure which effectively dissipates heat by utilizing not only a large heat radiation area but also maximum convective effects.

Yet another object is to provide a brake drum which is peculiarly resistant to bell mouthed expansion.

A further object is to provide a brake drum in which the intensity of sound produced by application of the brakes is minimized.

With these and other equally important objects in view the invention comprehends the idea of forming the exterior surface of the brake drum with substantially lateral or diagonally disposed heat radiating fins which increase in height as they extend from the head of the drum towards the marginal flange. The diagonally disposed fins thus subserve a number of functions. In the first place, due to their relative position, that is to their diagonal or helicoidal configuration, they tend to institute currents of air and to guide or deflect these diagonally over the surface of the brake drum so as to cause a cooling current of high velocity to pass over the heat dissipating surface of the drum. In common with other heat radiating fins they of course increase the effective heat radiation area. Furthermore, due to their tapered formation, they in fact comprise webs whose thickness or height increases from the head to the marginal flange. The rigidity they impart to the braking flange increases towards the marginal flange and maximum rigidity is imparted at the marginal edge. This provides maximum resistance against bell-mouthed expansion, one recognized disadvantage in brake drums, and furthermore provides improved tonal effects. As explained in copending application Serial No. 551,141, filed July 15, 1931, the provision of metal members extending from the head to the marginal lip of the braking flange tends to stiffen this flange and diminish the amplitude of vibration of that section of the flange adjacent the marginal edge. Since the intensity of the sound produced by vibration of the drum increases as the square of the amplitude of vibration, this structure tending to restrict the amplitude correspondingly diminishes the intensity of any squeal produced.

With the given concept in view it will be appreciated that a number of specifically different designs of drum may be made up which incorporate the fundamental features of the invention. To clearly explain the invention one preferred modification is shown in the accompanying drawing, in which:

Fig. 1 is an elevation of the drum, from the wheel side; and

Fig. 2 is a cross section of the drum.

The drum may comprise a head 1 and circumferential braking flange 2 of any desired material, such as a low carbon stamping or a cast member. As is usual in the art, the head is provided with apertures 3 through which securing means are passed to attach the drum to the spokes or discs of a cooperating wheel.

According to the present invention, and assuming that a drum is to be employed with an internal expanding brake, the exterior surface of the braking flange is formed with the special fins 4. These may be formed integral with the flange or may comprise separate members which are preferably molecularly bonded to the head, as by means of seam welds. Preferably the fins 4 are of tapered formation, having a minimum width at 5, adjacent the head, and a maximum width at 6, adjacent the marginal lip or free edge of the brake drum. As shown in Fig. 2, the fins are disposed diagonally of the braking flange and preferably are of curved shape so as to function as fluid deflectors. With this structure it will be seen that as the drum rotates in the direction of the arrow in Fig. 2, the fins 4 serve to deflect air currents diagonally and transversely across the braking flange, and furthermore effect an increased turbulence of the air body through which the drum rotates. By instituting and deflecting these filaments or streams of air laterally across the drum, increased dissipation by convection is achieved.

The form of the fins, furthermore, provide for more uniform withdrawal and dissipation of heat from the drum inasmuch as they insure the accumulation of a relatively large mass of metal adjacent the marginal edge. In the usual brake drum the braking flange is of relatively thin material. The inside of the braking flange is continuous with the braking head so this portion in effect constitutes a relatively large mass of metal having a correspondingly high heat capacity. The free or marginal edge of the brake drum, which is subjected substantially to the same temperatures has a smaller quantity of metal, tends to increase in temperature more rapidly. By the present construction a relatively large mass of metal is distributed or disposed adjacent the marginal edge and the temperature across the braking flange is maintained more uniform. Furthermore, by employing fins of tapered form the exterior circumference of the drum, as defined by the tops of the heat dissipating fins, is considerably increased and its longitudinal movement relative to the air body for a given speed of the vehicle is correspondingly increased. This increase in speed increases the convective effects.

As noted hereinbefore, the intensity of loudness of the squeal or noise elicited from the brake drums is a function of the amplitude of vibration. More specifically considered, the loudness of the squeal is a function of the extent to which the free edge or marginal lip of the drum is displaced in a given vibration. By the present construction the free edge is considerably rigidified due to the height of the fin at this edge. This fin in effect acts as a rigidifying web member and tends to check or minimize radial displacement of the drum. By disposing the fins transversely of the drum and of non-uniform section, vibrations set up in the brake flange proper are considerably buffed or nullified. This is due largely to the fact that the lateral fins present a natural period of vibration quite different from that of the braking flange proper and, as is well known, by rigidly associating two members of different periods the tendency of one of the elements to vibrate at a given speed is modified.

It will thus be seen that the present construction insures a number of useful functions. From the thermal standpoint it is highly efficient because it increases the dissipation of the generated heats both by radiation and by increased convection for the reasons pointed out. It insures improved mechanical effects because of the general rigidity it imparts to the brake drum, and also to the specific rigidity which it imparts to the marginal or free edge of the brake drum, thus tending, as pointed out hereinbefore, to prevent bell-mouthed expansion. The construction insures improved acoustical properties for the reasons stated, namely that it tends to restrict the amplitude of vibration of the sound producing member. Therefore, while a specific construction has been described and shown, it is understood that this is given merely as illustrative of any type of brake construction in which these effects, either separate or in combination, are secured. Therefore it is not intended to restrict the invention to the structure shown and disclosed, except as limitations specifically thereto are clearly imposed by the appended claims.

I claim:

1. A brake drum comprising a head and braking flange, the flange being formed with solid fins of gradually increasing height.

2. A brake drum comprising a head and braking flange, the flange being formed exteriorly with solid fins of tapered cross sectional form.

3. A brake drum comprising a head and braking flange, the flange being formed exteriorly with diagonally positioned solid fins of tapered cross sectional form.

4. A brake drum comprising a head and braking flange, the flange being formed with laterally extending solid fins of non-uniform depth.

5. A brake drum comprising a head and braking flange, the flange being formed with diagonally extending solid fins of non-uniform depth and having the greatest depth adjacent the free edge of the braking flange.

In testimony whereof, I have hereunto signed my name.

RAYMOND J. NORTON.